United States Patent
Priefert

[15] 3,683,864
[45] Aug. 15, 1972

[54] CATTLE CHUTE

[72] Inventor: Marvin H. Priefert, R.R. 1, Mt. Pleasant, Tex. 75455

[22] Filed: Oct. 21, 1970

[21] Appl. No.: 82,609

[52] U.S. Cl. ................................................ 119/99
[51] Int. Cl. ............................................ A61d 03/00
[58] Field of Search ........................ 119/99, 98, 103

[56] References Cited

UNITED STATES PATENTS

| | | | |
|---|---|---|---|
| 1,891,852 | 12/1932 | Turner | 119/99 |
| 1,805,405 | 5/1931 | Kuhns | 119/99 X |
| 2,576,654 | 11/1951 | Thorson | 119/99 |

*Primary Examiner*—Hugh R. Chamblee
*Attorney*—Rudolph L. Lowell

[57] ABSTRACT

The cattle chute includes a pair of transversely opposite side panels of of which constitute a squeeze panel that is pivotally movable about a horizontal axis into a from an animal squeezing portion relative to a second or normally stationary panel. End gates at opposite ends of the cattle chute control the entrance and exit of an animal fore and aft of the chute, with at least one of such gates having adjustable neck engaging members for engaging and restraining an animal positioned in the chute. The normally stationary panel is pivotally movable about a vertical axis from a closed position opposite the squeeze panel to an open position providing a side exit for the chute. Pivotal movement of the side panels is controlled by foot actuated levers that are arranged at one end of the cattle chute.

5 Claims, 18 Drawing Figures

PATENTED AUG 15 1972 3,683,864

INVENTOR
MARVIN J. PRIEFERT
BY
ATTORNEY

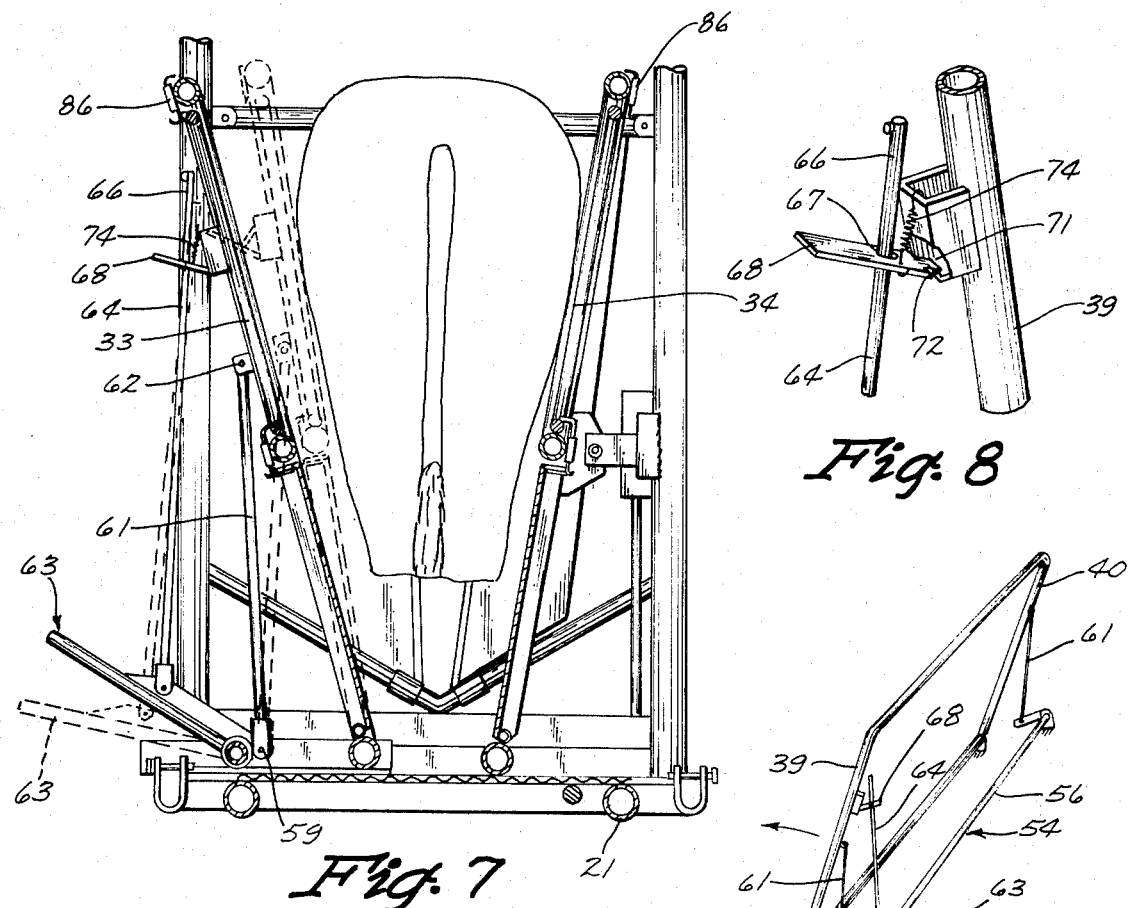
Fig. 7
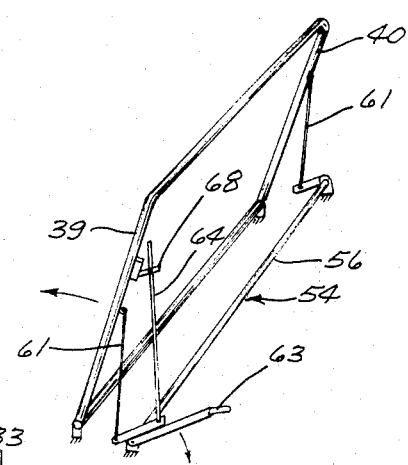
Fig. 8
Fig. 9
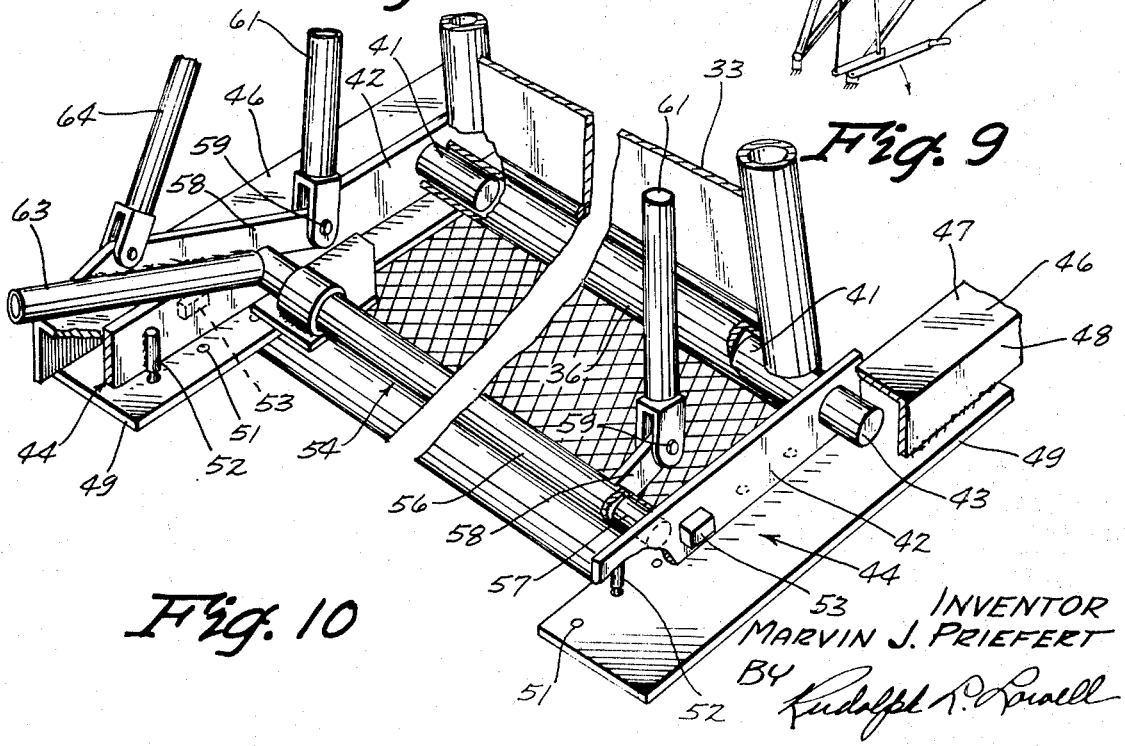
Fig. 10
INVENTOR
MARVIN J. PRIEFERT
BY
ATTORNEY

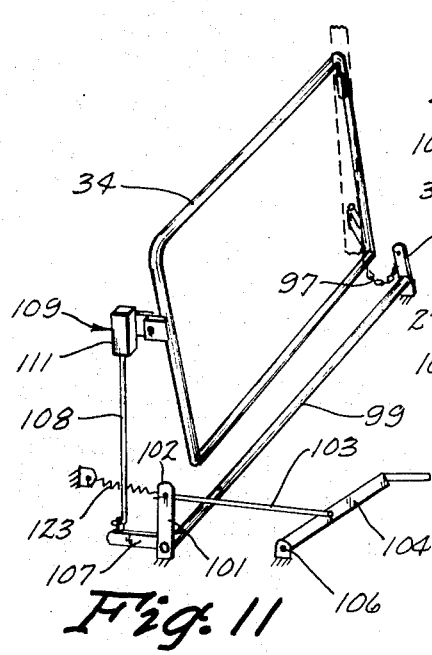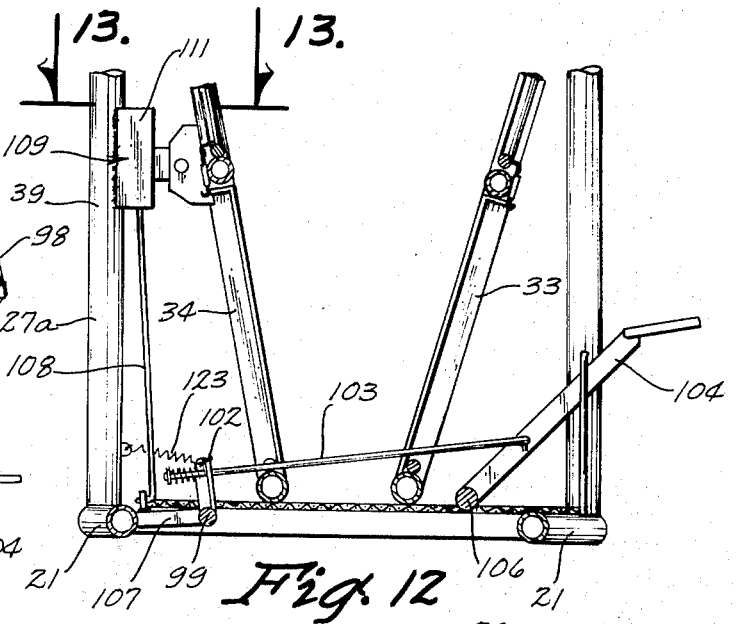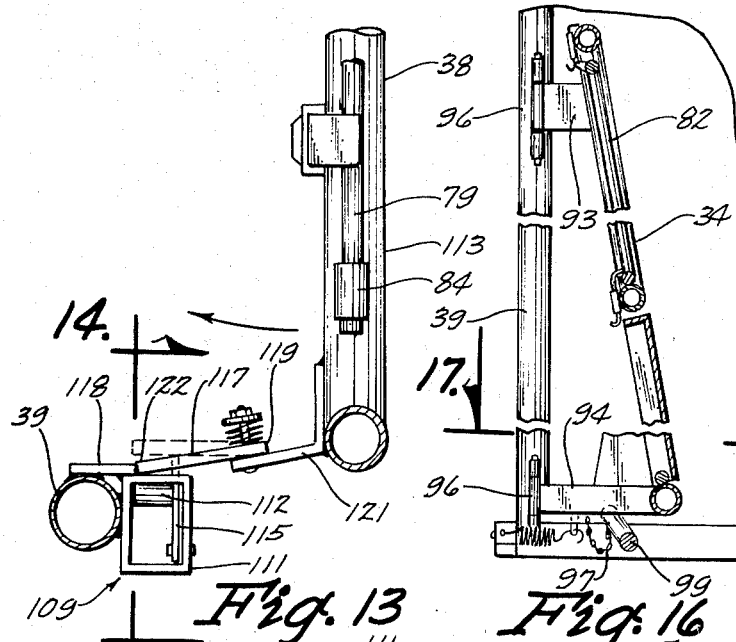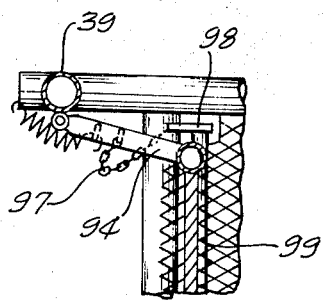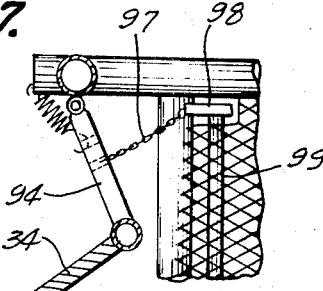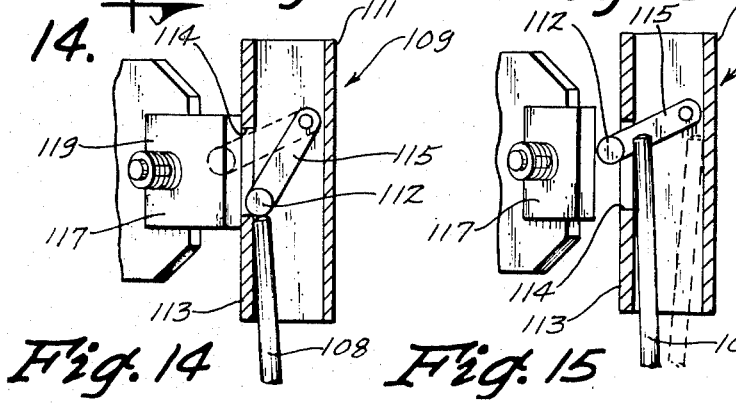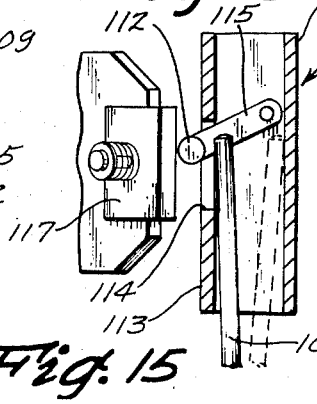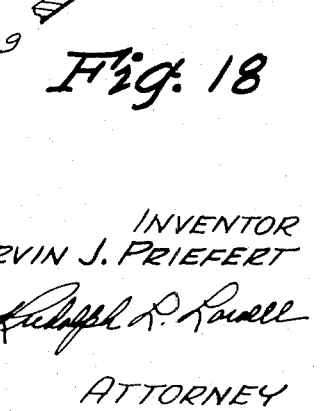

CATTLE CHUTE

SUMMARY OF THE INVENTION

The chute is of a compact construction, efficient in operation and readily transported to different job locations. The squeeze side panel is adjustable transversely of the chute prior to a squeezing operation so as to accommodate animals of different sizes. The normally stationary side panel may be operated as a side exit gate and in conjunction with the front end gate on the chute provides for an immediate sorting of animals to different pens depending on the nature of the treatment given the animals while in the chute. The squeeze operation of the squeeze panel and the gate action of the normally stationary panel are manually accomplished by separate levers that are located together near the front or head of the chute. Overhead levers, ropes and the like, which constitute potential dangers to the safety of the operator when working on or treating an animal are thus substantially eliminated. Animal treatment is facilitated by forming each side panel with a plurality of pivoted panel sections that are separately movable to open positions to provide unobstructed access to selected parts of an animal being treated without removing the confining restraint of the animal.

BRIEF DESCRIPTION OF THE DRAWINGS

FIG. 7 is an enlarged sectional view as seen on the line 7 — 7 in FIG. 2;

FIG. 8 is a detail perspective view showing a locking means for holding a squeeze panel in an animal squeezing position;

FIG. 9 is a diagrammatic perspective view showing assembly relation of the locking means of FIG. 8 with a foot actuated means for moving the squeeze panel to a squeezing position;

FIG. 10 is a foreshortened detail perspective view of the means for adjusting the squeeze side panel transversely of the chute base frame to accommodate animals of different size;

FIG. 11 is a diagrammatic perspective view showing the assembly relation of a foot actuated means and a latch mechanism for releasably locking the normally stationary panel in a closed position and for moving such panel from an open position to its normally closed position;

FIG. 12 is a fragmentary sectional view taken on the line 12 — 12 in FIG. 2;

FIG. 13 is an enlarged sectional view as seen on the line 13 — 13 in FIG. 12;

FIG. 14 is a sectional view taken on the line 14 — 14 in FIG. 13;

FIG. 15 is illustrated similarly to FIG. 14 showing parts thereof in changed positions;

FIG. 16 is a sectional detail view showing the hinge support and panel section construction of the normally stationary side panel;

FIG. 17 is a sectional detail view taken on the lines 17 — 17 in FIG. 16; and

FIG. 18 is illustrated similarly to FIG. 17 and shows parts thereof in changed positions.

DETAIL DESCRIPTION OF THE INVENTION

Figure 1:
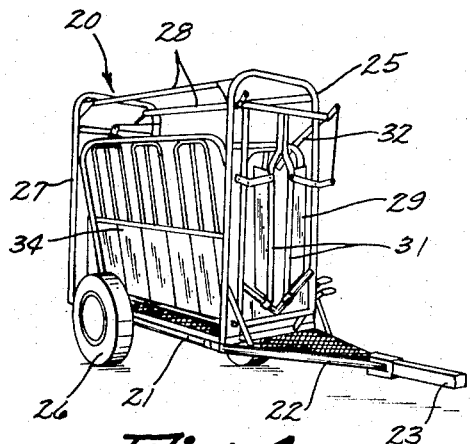
FIG. 1 is a front perspective view of the cattle chute of this invention shown in transport position.
Figure 2:
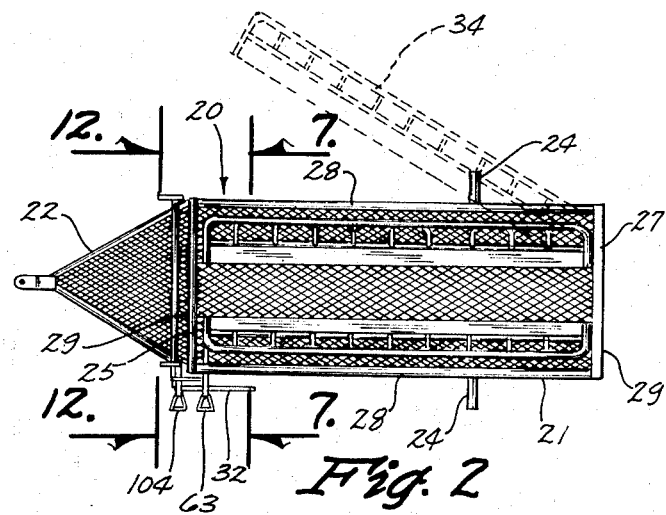
FIG. 2 is an enlarged top plan view of the chute shown in an operative position.
Figure 3:
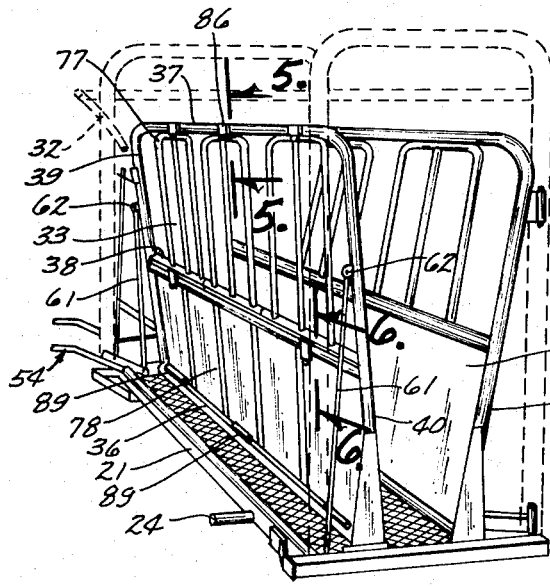
FIG. 3 is a perspective view showing the assembly relation of a pair of side panels and a base frame which forms part of the chute.

With reference to the drawings, the chute of this invention designated generally at 20 in FIGS. 1 and 2, includes a main rectangular shaped base frame 21 equipped with a tongue structure 22 for connection to a draw bar 23 of a towing vehicle (not shown) and stub axle shafts 24 for ground wheels 26, only one of which is illustrated. After the chute 20 has been towed to a working location, the wheels 26 and the draw bar 23 are removed so that the base frame 21 can rest directly on the ground surface as shown in FIGS. 2 and 3. Transverse upright frames 25 and 27, hereinafter to be referred to as a front end frame and rear end frame, respectively, are secured to opposite ends of the base frame 21. Each frame 25 and 27 is of an inverted U-shape having the base sections thereof connected together by a longitudinally extended top member 28. Each end frame 25 and 27 is associated with a chute gate, generally indicated at 29, having neck engaging members 31 which are movable by a manually operated lever 32 toward and away from each other into and out of engagement with opposite side portions of the neck of an animal to be restrained within the chute 20.

Extended between the end frames 25 and 27 and spaced transversely of the base frame 21, are a pair of side panels 33 and 34, which for convenience will be hereinafter referred to as a squeeze panel and normally stationary panel, respectively. The panels 33 and 34, as clearly illustrated in FIG. 3, are inclined inwardly and downwardly toward each other, with the squeeze panel 33 being movable into and from an animal squeezing position relative to the stationary side panel 34.

The squeeze panel 33 (FIGS. 3 and 10) is of a generally rectangular shape and tubular construction and includes a lower longitudinal side member 36 and upper longitudinal side member 37 and an intermediate longitudinal member 38 extended between and connected to front and rear upright end members 39 and 40, respectively. The lower side member 36 (FIG. 10) has its opposite ends rotatably supported on stub shafts 41 secured to corresponding upright mounting plates 42 extended transversely of the base frame 21, with each shaft 41 having an end section 43 projected outwardly from an adjacent mounting plate 42. The squeeze panel 33 is thus rotatably supported at the lower side member 36 for pivotal movement toward and away from the stationary panel 34.

A mounting plate 42 forms a part of an adjusting mechanism, indicated generally at 44, for adjusting the lower side member 36 of the squeeze panel 33 transversely of the base frame 21 and relative to the stationary panel 34 to vary the spacing between the panels 33 and 34 to accommodate animals of different sizes.

Each adjusting mechanism 44 includes an elongated guide member 46 of an angle iron construction extended transversely of the base frame 21 with one leg 47 arranged horizontally with its free end in contact engagement with a corresponding mounting plate 42 at a position spaced above the projected end 43 of a stub shaft 41. The other leg 48 of the guide member 46 is positioned upright with its lower side secured as by weldments to a base plate 49 that is suitably secured to the base frame 21. A vertical leg 48 is spaced outwardly from a corresponding shaft end 43 so that a guide member 46, mounting member 42 and base plate 49 form a tubular enclosure for a shaft end section 43.

A base plate 49 is formed with a row of openings 51 spaced transversely of the base frame 21 and positioned adjacent the inner side of an upright mounting plate 42. A locking pin 52 on a mounting plate 42 is selectively received within an opening 51 to hold the squeeze panel 33 in an adjusted position. Insertion of a pin 52 within a selected opening 51 is accomplished by merely lifting the pin holding end of a mounting plate 42 upwardly so as to tilt the mounting plate 42. In a tilted position the mounting plates 42 and lower side member 36 of the squeeze panel 33 are movable as a unit transversely of the base frame 21 to an adjusted position of the locking pins 52 to selected openings 51. The movement of a mounting plate 42 is guidably maintained by the engagement thereof with the free end of the guide leg 47, with a shaft end 43 being engageable with the under side of the leg 47 to limit the vertical movement of a mounting plate 42 relative to a corresponding guide member 46. This limiting action of a shaft 43 is complemented by the provision of an abutment block 53 secured to a mounting plate 42 at a position adjacent a locking pin 52 and within a guide member 46.

Pivotal movement of the squeeze panel 33 relative to the stationary panel 34 is accomplished by a foot operated means 54 that includes a tubular rock shaft 56 arranged parallel to and spaced transversely outwardly from the lower side member 36 of the squeeze panel 33. The rock shaft is rotatably supported on stub shafts 57 secured to and projected inwardly from a corresponding mounting plate 42. Adjacent each end of the rock shaft 56 is a rock arm 58 to which is pivotally connected at 59 the lower end of a push link 61, the upper end of which (FIGS. 3 and 7) is pivotally connected at 62 to an adjacent rear end member 39 or 40 at a position between the upper and intermediate longitudinal members 37 and 38, respectively.

A foot lever 63 (FIGS. 9 and 10) projects radially of the rock shaft 56 so as to extend laterally outwardly from the base frame 21 adjacent the front end frame 25. The foot lever is secured to the rock shaft 56 at a position such that on depression thereof the rock arms 58 are rotated in a direction providing for the lifting of the push links 61 to pivotally move the squeeze panel 33 toward the normally stationary panel 34. On a release of the foot lever 63 the squeeze panel 33 is moved away from the side panel 34 by the action of gravity.

To automatically lock the squeeze panel 33 in the squeezing position therefor there is pivotally connected to the front lever 63 the lower end of a locking rod 64 (FIGS. 7 and 8) which has an upper end section 66 guidably movable through an opening 67 formed in a pivoted plate member 68. A tongue section 71 on the plate 68 is inserted within an opening 72 formed in the side wall of a mounting member that is carried on the front end member 40. This pivotal support of the plate 68 is maintained by a spring 74 arranged in tension so as to continuously pivot the plate member 68 in an upward direction.

It is seen, therefore, that when the locking rod 64 is moved downwardly in response to a depression of the foot lever 63 (FIGS. 8 and 9) the plate member 68 moves with the squeeze panel 33 along with being concurrently pivoted downwardly by the rod 64 to permit a relative sliding movement between the rod and the plate 68. However, when the squeeze panel 33 has been moved to a squeezing position therefor, upward pivotal movement of the plate 68 relative to the rod 64 results in a binding action of the side wall of the opening 67 on the rod whereby to positively hold the squeeze panel 33 in a squeezing position relative to the side panel 34. In order to permit movement of the squeeze panel 34 away from the squeezing position therefor it is only necessary to manually move the plate 68 downwardly relative to the locking rod 64. The plate 68 thus constitutes a releasable latching mechanism for positively locking the rod 64 in a pivotally adjusted position of the squeeze panel 33.

As thus far described, it is seen that an animal is admitted entrance into the chute 20 from the rear end thereof when the chute gates 29 are in their open positions. When the head of the animal extends through the front chute gate 29, the neck engaging members 31 are moved into their neck engaging positions by the manual actuation of the lever 32 (FIG. 2). The animal is thus restrained against fore and aft movement. To prevent lateral movement of the animal the squeeze panel 33 is operated by the foot lever 63 from its full line position in FIG. 7 to the dotted line therefor in the same figure, whereby to squeeze or engage opposite sides of the animal between the panels 33 and 34. With the animal thus restrained against both fore and aft and lateral movements, the operator can perform all necessary treatment on the animal without danger of being injured.

Figure 4:
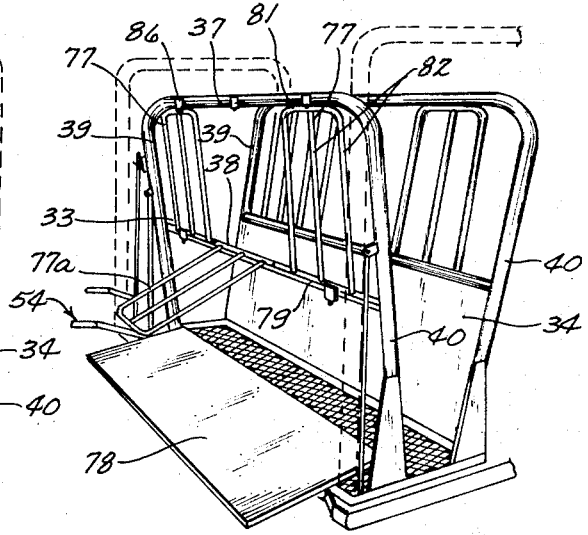
FIG. 4 is illustrated similarly to FIG. 3 and shows certain pivoted panel sections for one of the side panels in open positions therefor.
Figures 5, 6:
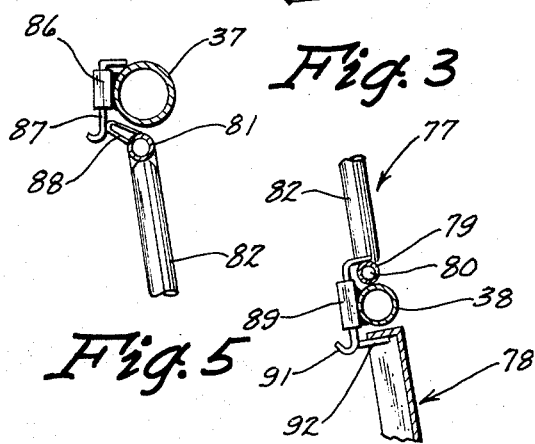
FIGS. 5 and 6 are enlarged detail sectional views taken on the lines 5 — 5 and 6 — 6, respectively, in FIG. 3.

In order to permit access to selected parts of an animal to be treated, each of the side panels 33 and 34 is comprised of a plurality of panel sections 77 and 78 (FIGS. 3 and 4). Each of the sections 77 is of an open frame construction with three of such sections being illustrated to cover the area between the upper side member 37 and intermediate longitudinal member 38. The panel 78 is of a solid construction and covers the area between the intermediate longitudinal member 38 and lower side member 36. Generally, each panel section 77 (FIG. 4) has a bottom member 79 and a top member 81 interconnected by a series of spaced bar members 82, illustrated as being three in number. Each bottom member 79 (FIGS. 4 and 13) has oppositely extended shaft or pin sections 80 that are rotatably mounted within sleeve bearings 84 secured to and spaced axially along the top side of an intermediate longitudinal member 38. Each panel section 77 is thus separately pivotally movable relative to the intermediate member 38 to a position projected outwardly from the side panel 33 or 34 as illustrated for the panel 77a in FIG. 4. A panel section 77 is releasably locked against pivotal movement by the provision of a latch mechanism 86 (FIG. 5) carried on the upper longitudinal member 37 and including a latch member 87 movable into and out of engagement with an abutment member 88 carried on the top member 81 of a panel section 77.

A solid panel section 78 (FIG. 3) has its lower side pivotally connected, as indicated at 89, to the lower side member 36 of a side panel 33 and 34 for pivotal movement to an open position therefor shown in FIG. 4. A panel section 78 is locked in its closed position shown in FIG. 3 by a latch mechanism 89 (FIG. 6) carried on the intermediate longitudinal member 38 and including a locking member 91 that is movable into and out of an engaging relation with an abutment member 92 secured to the upper side of a panel member 78.

As previously mentioned, and as shown in FIG. 7, the side panel 34 is normally stationary when an animal is being squeezed between the panels 33 and 34. However, depending upon the type of treatment, it is oftentimes desirable to separate the animals into different pens. For this purpose, the normally stationary side panel 34 is swingable as a gate to the dotted line position of FIG. 2 to permit an animal to leave the chute 20 from the panel side 34 thereof. Thus, as shown in FIG. 16, the panel member 34 is provided with an upper hinge member 93 and a lower hinge member 94 for pivotal support at 96 on an end member 40 of the rear end frame 27 for pivotal movement about a vertical axis. Swinging movement of the panel 34 to its open position in FIG. 18 is limited by an adjustable chain member 97 attached at one end to the lower hinge member 94 and at its opposite end to a rock arm 98 carried at the rear end of a rock shaft 99 extended longitudinally of and supported on the base frame 21 for a purpose to appear later.

The front end of the rock shaft 99 (FIGS. 11 and 12) carries a bell crank 101 having an arm 102 pivoted to one end of a connecting link 103. The other end of the link 103 is pivoted to a foot lever 104 that is pivotally connected at 106 on the base frame 21 forwardly of the front end frame 25 at a position adjacent to the foot lever 63 as best appears in FIG. 2. The other arm 107 of the bell crank 101 is pivotally connected to the lower end of a rod 108 for actuating a latch mechanism 109 (FIG. 13) carried on a member 39 of the front end frame 25 for releasably locking the side panel 34 in its normally closed or stationary position.

The latch mechanism 109 (FIGS. 13 and 14) includes an upright tubular housing 111, secured as by weldments, to a member 39. A latch member 112 is carried at the end of an arm 115 pivotally supported within the housing 111 for pivotal movement of the latch member 112 into and out of an opening 114 formed in a side wall 113 of the housing 111. As best appears in FIG. 14, when the actuating rod 108 is in its lowermost position the latch member 112 is located within the housing 111 in resting engagement on the lower wall of the opening 114. At this rest position of the latch member 112 the upper end of the actuating rod 108 is supported against the inner surface of the housing side wall 113. In response to a downward movement of the foot lever 104 (FIG. 11), the actuating rod 108 is moved upwardly in guidable engagement with the housing wall 113 so as to engage and move the latch member 112 outwardly of the housing 111 through the opening 114, as shown in dotted lines in FIG. 14. On completion of this actuation of the latch member 112 by the actuating rod 108, the upper end of the rod 108 moves out of engagement with the latch member 112 to its full line position shown in FIG. 15.

The movement of the latch member 112 outwardly from the opening 114 engages and moves a panel locking member 117 out of abutting engagement with a stop plate 118 carried on a member 39 of the front end frame 25 (FIGS. 13 and 14). The locking member 117 is of a flat plate shape yieldably mounted at one end 119 to a bracket member 121 carried on the side panel 34. As a result of this yieldable support of the locking member 117 the end 122 thereof for engaging the stop plate 118 is yieldably movable relative to the supported end 119 into and out of engagement with the stop plate 118. With the locking member 117 out of an engaged position with the stop plate 118, the side panel 34, by the action of gravity, is swingable about its pivotal support 96 from a chute closing position shown in FIG. 2 to a chute side opening position shown in dotted lines in the same figure. This open position of the side panel 34 is limited by the extension of the chain 97 to its full length shown in FIG. 18.

Also, with the release of the locking member 117 out of an engaged position with the stop member 118, the latch member 112 is free to drop from its dotted line position in FIG. 14 to its normal rest position shown in full lines in the same figure. During this movement and as illustrated in FIG. 15, the latch member 112 engages and trips the rod 108 from its full line position to its dotted line position. This position of the rod 108 relative to the latch member 112 thus takes place after the side panel 34 has been released for pivotal movement to a side chute opening position and with the foot lever 104 in only a partially depressed position. As previously noted, the extension of the chain 97 to its full length limits, the opening movement of the side panel 34 to its position shown in FIG. 18. On a continued and accelerated depression of the lever 104, to its lowermost position, the rock arm 98 pulls on the chain 97 to move the side panel 34 into its closed position with a slamming action.

As the side panel 34 approaches the normally closed position therefor, the locking member 117 yieldably slides over the stop plate 118 until the side panel 34 is in the fully closed position of FIG. 13 and at such time the locking member end 122 drops into abutting engagement with the stop plate 118. The accelerated downward movement of lever 104 also provides for a tilting of the rod 108 from its dotted line position shown in FIG. 15 to its full line position shown in FIG. 14 beneath the latch member 112. The lever 104 is returned to its upper or rest position shown in FIG. 12 by the action of a coil spring 123 connected to the arm 102 of the bell crank 101 and the front end frame 25.

It is thus seen that the latch mechanism 109 is completely controlled by actuation of the foot lever 104 to the release of locking positions therefor providing for the gate action of the panel 34 to form an animal side exit for the chute 20. The lever 104 is positioned closely adjacent to the foot lever 63 and to the outside of the squeeze panel 34 so that the chute 20 is readily operated to receive an animal and then discharge the animal through either the front chute gate 31, or the side gate provided by the panel 34, with the operator at all times being in a protected position from the animal.

In this respect, it is to be noted that the manual lever for operating the chute gate 31 is also located at the front end frame 25 for convenient access by the operator.

Although the invention has been described with respect to a preferred embodiment thereof, it is to be understood that it is not to be so limited since changes can be made therein which are within the full intended scope of this invention as defined by the appended claims.

I claim:
1. A cattle chute comprising:
   a. a base frame of a rectangular shape,
   b. a pair of transversely spaced side panels including a stationary side panel and a pivoted side panel pivotally movable into and from a squeezing position relative to said stationary side panel,
   c. support means on said base frame for said stationary side panel,
   d. pivot means on said base frame pivotally supporting the lower side of said pivoted side panel,
   e. foot operated means on said base frame for pivotally moving said pivoted side panel,
   f. means for releasably locking said pivoted side panel in a pivotally moved position,
   g. means on said base frame for adjusting said pivot means and said foot operated means transversely of said base frame to vary the transverse spacing between said pair of side panels, said adjusting means including a common support means for said pivot means and said foot operated means, and
   h. means on said base frame selectively engageable with said common support means to define an adjusted position of said common support means transversely of said base frame.
2. A cattle chute comprising:
   a. a base frame of a rectangular shape,
   b. a pair of transversely spaced side panels including a stationary side panel and a pivoted side panel pivotally movable into and from a squeezing position relative to said stationary side panel,
   c. support means on said base frame for said stationary side panel,
   d. pivot means on said base frame pivotally supporting the lower side of said pivoted side panel,
   e. foot operated means on said base frame for pivotally moving said pivoted side panel,
   f. means for releasably locking said pivoted side panel in a pivotally moved position,
   g. said foot operated means including a rock shaft extended longitudinally of said base frame with the axis thereof parallel to and spaced outwardly from the axis of said pivot means,
   h. a rock arm adjacent each end of said rock shaft,
   i. an upright link member corresponding to each rock arm having a lower end pivotally connected to a rock arm and an upper end pivotally connected to said pivoted side panel, and
   j. a foot actuated lever secured to and extended radially from said rock shaft in a direction away from said pivoted side panel.
3. The cattle chute according to claim 2 including:
   a. coacting means on said pivoted side panel and said foot actuated lever for automatically releasably locking said pivoted side panel in the squeezing position therefor.
4. The cattle chute according to claim 3 wherein:
   a. said coacting means includes an upright locking rod pivotally connected at the lower end thereof to said foot actuated lever, and
   b. a pivoted latch mechanism on said pivoted side panel having a portion in guidable engagement with said locking rod,
   c. said latch mechanism, when pivotally moved in one direction by said rod, providing for the axial movement of said rod relative to said guide portion and, when pivotally moved in an opposite direction by said rod, providing for a binding engagement of said guide portion with the rod.
5. A cattle chute comprising:
   a. a base frame of a rectangular shape,
   b. a pair of longitudinally spaced upright posts on one side of said base frame,
   c. a pair of transversely spaced squeeze panels including a first panel and a second panel positioned transversely opposite said first panel,
   d. first means pivotally supporting said first panel on one of said upright posts for swinging movement to an open position extended laterally from said base frame and to a close position extended between said pair of upright posts,
   e. coacting means on the other of said posts and on said first panel for releasably latching the first panel in the closed position therefor,
   f. second pivot means on said base frame pivotally supporting the lower side of said second panel for pivotal movement of the second panel into and from a squeezing position relative to said first panel when the first panel is in the closed position therefor,
   g. a first foot operated means on said base frame for pivotally moving said second panel including a foot actuated lever,
   h. a second foot operated means for releasing said latching means to provide for the swinging movement of said first panel to the open position therefor, including means for moving the first panel from said open position to the closed position therefor, and
   i. a second foot lever for actuating said second foot operated means positioned adjacent the foot lever for said first foot operated means.

* * * * *